United States Patent [19]

Eggers

[11] Patent Number: 4,509,160
[45] Date of Patent: Apr. 2, 1985

[54] DISC DRIVE ASSEMBLY

[76] Inventor: Fred S. Eggers, 3961 Altadena La., San Jose, Calif. 95127

[21] Appl. No.: 558,320

[22] Filed: Dec. 5, 1983

[51] Int. Cl.³ ............................ G11B 3/36; F16C 32/06
[52] U.S. Cl. ..................................... 369/269; 369/261; 360/103; 360/104; 384/121
[58] Field of Search ............... 369/269, 266, 268, 261, 369/270; 360/103; 384/121; 308/110, 99, DIG. 1; 188/170, 72.3

[56] References Cited

U.S. PATENT DOCUMENTS

| 3,479,038 | 10/1967 | Eisner | 369/269 |
| 3,676,874 | 7/1972 | Turner | 360/103 |
| 3,741,352 | 6/1973 | Hedrick | 188/170 |
| 3,751,044 | 8/1973 | Sawada | 369/269 |
| 3,811,856 | 5/1974 | Ruszczyk et al. | 360/103 |
| 3,975,771 | 8/1976 | Lazzari | 360/103 |
| 4,071,854 | 1/1978 | Bijon et al. | 360/103 |
| 4,087,095 | 5/1978 | Koda | 369/269 |
| 4,234,195 | 10/1980 | Shibata | 369/270 |
| 4,339,814 | 7/1982 | Canino | 369/269 |
| 4,367,546 | 1/1983 | Shibata | 369/271 |

Primary Examiner—Steven L. Stephan
Attorney, Agent, or Firm—Flehr, Hohbach, Test, Albritton & Herbert

[57] ABSTRACT

A disc drive assembly in which an air bearing supports the drive spindle in a manner centering the drive spindle to provide extremely close track spacing and a transducer assembly characterized by an air bearing therebeneath and a suction serving to draw the transducer assembly closely to the disc surface against the air bearing.

8 Claims, 14 Drawing Figures

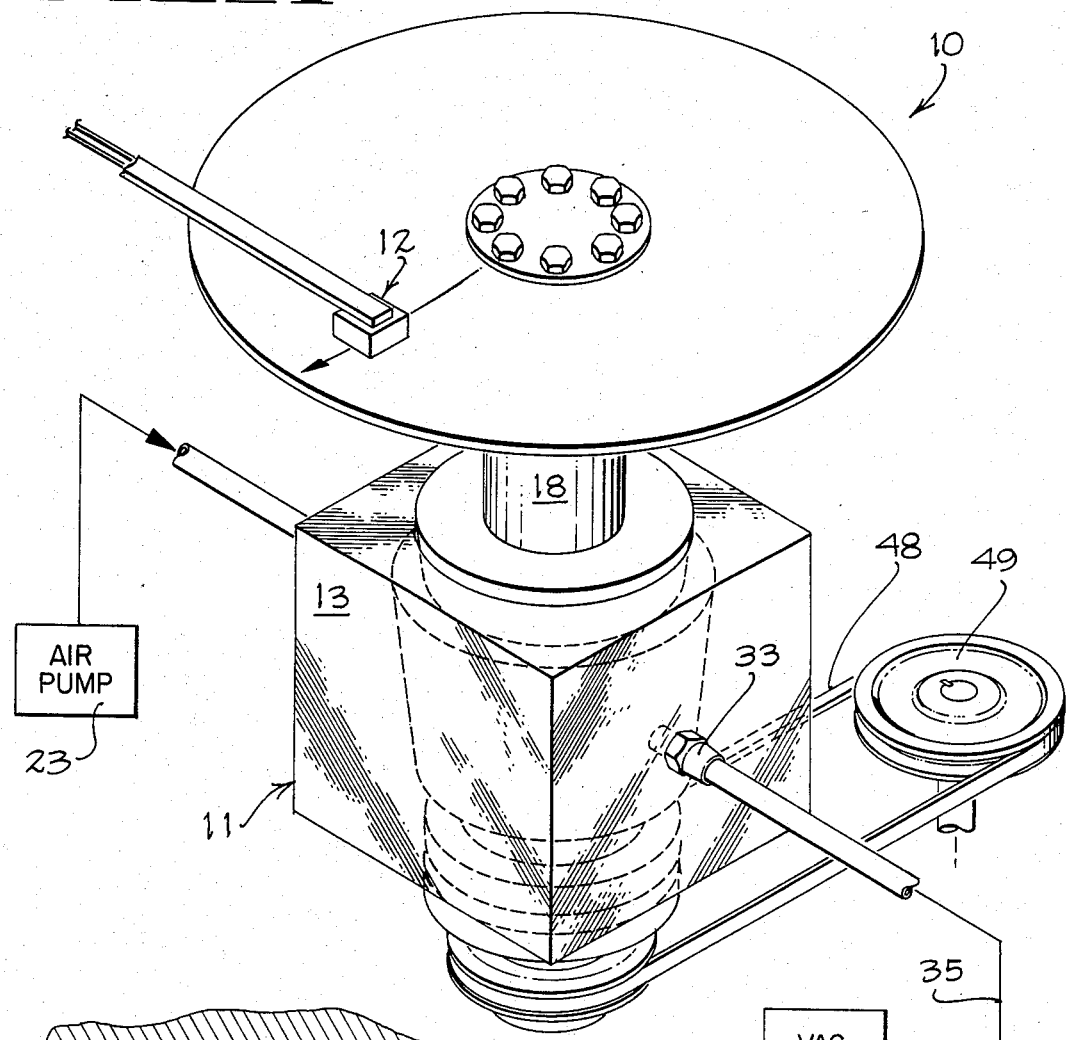
FIG_1
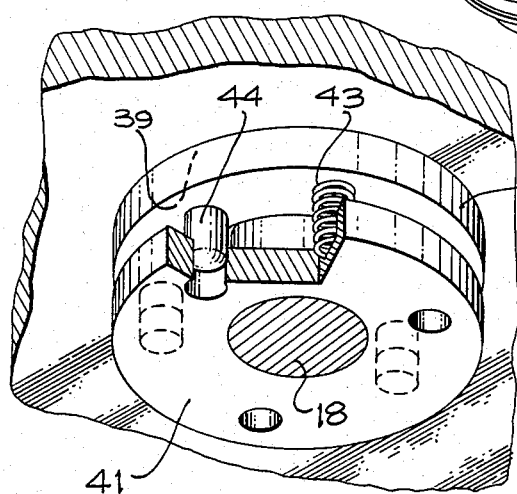
FIG_2

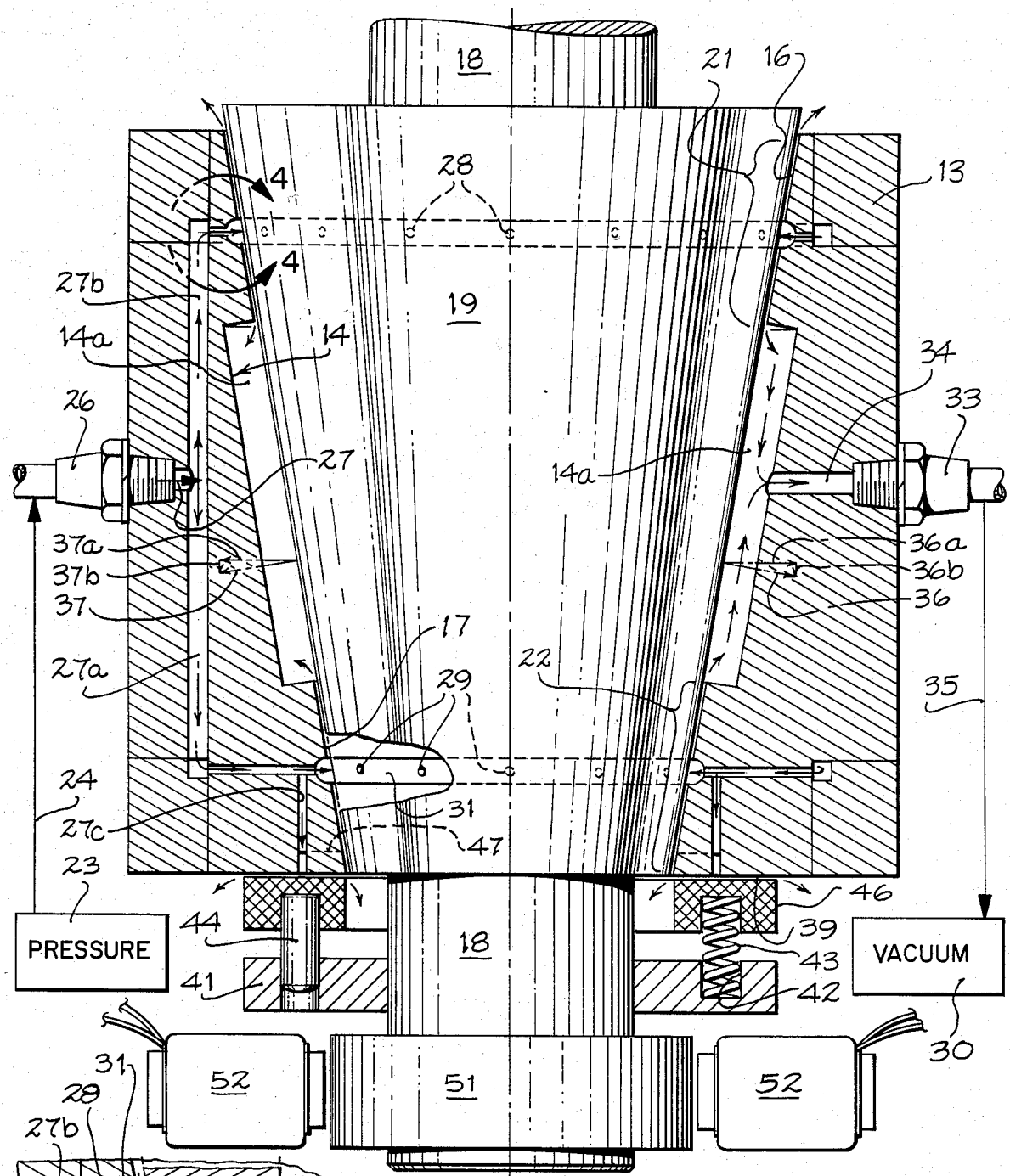

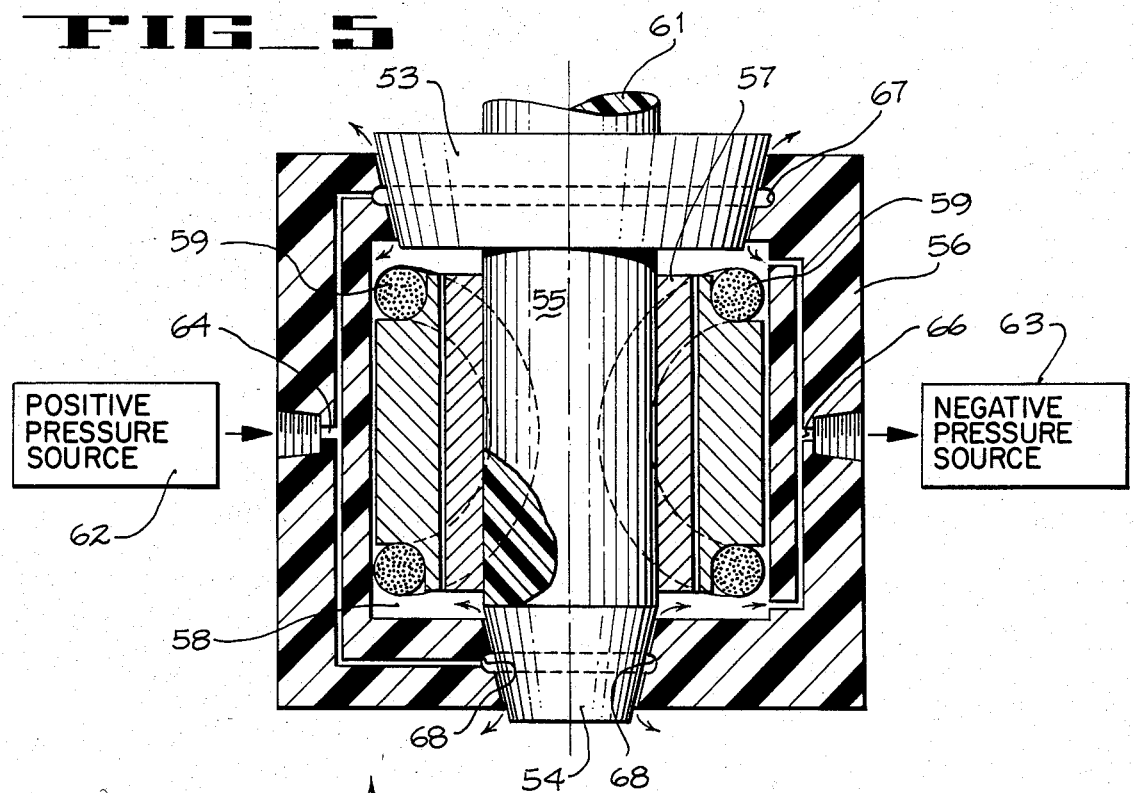
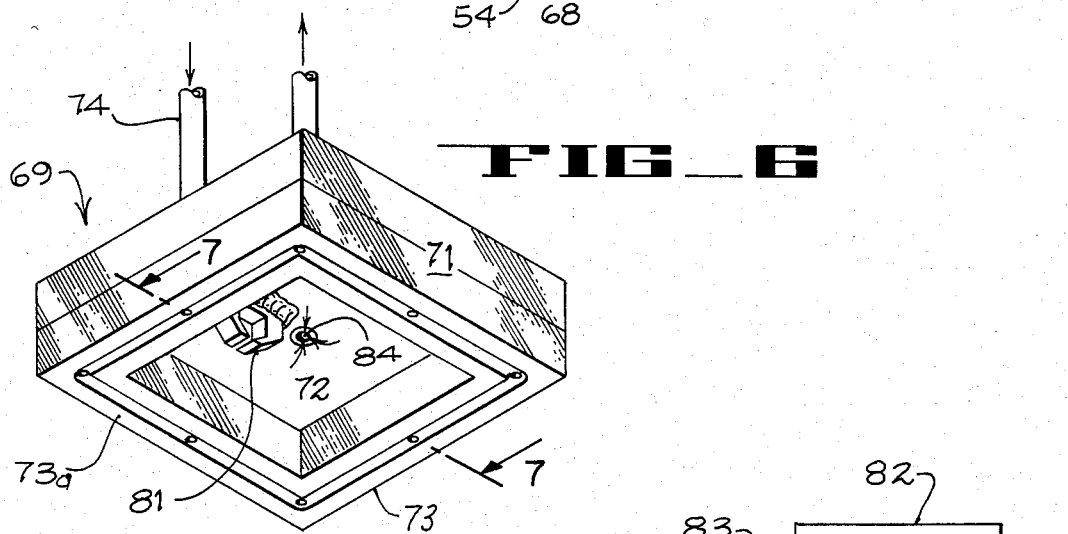
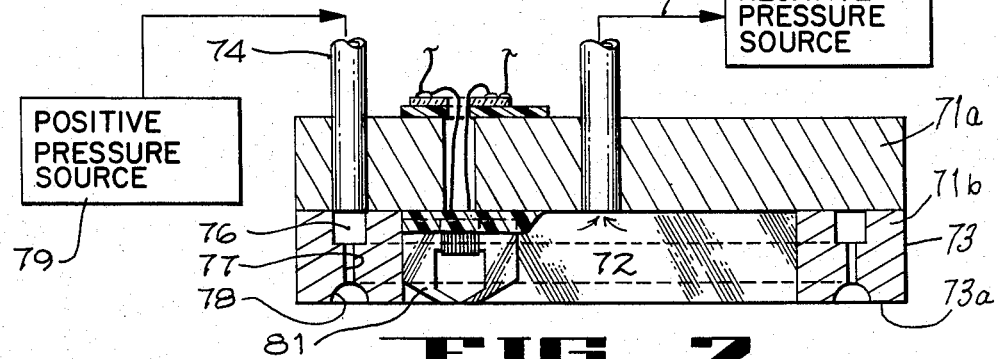

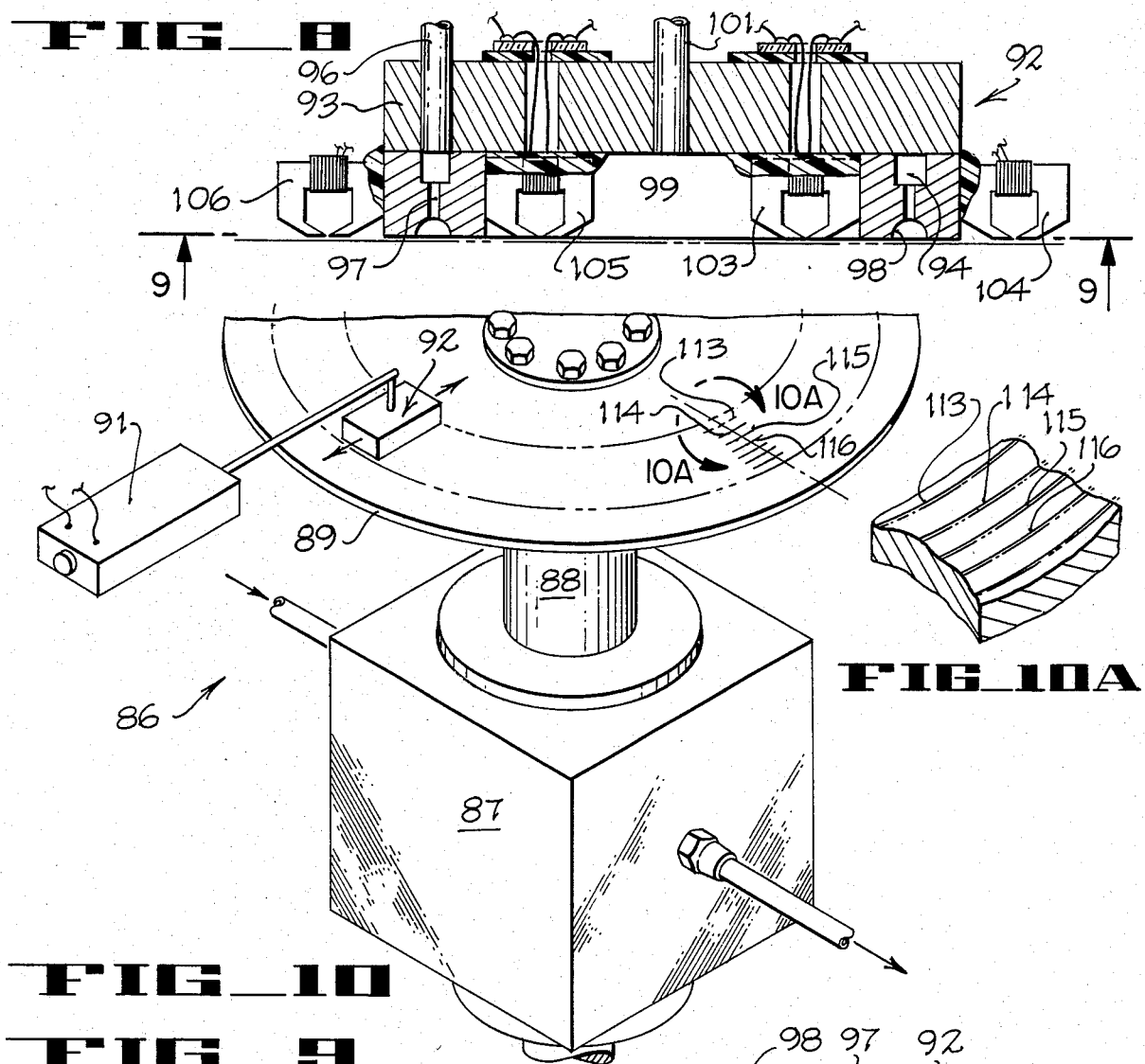
FIG_8
FIG_10A
FIG_10
FIG_9

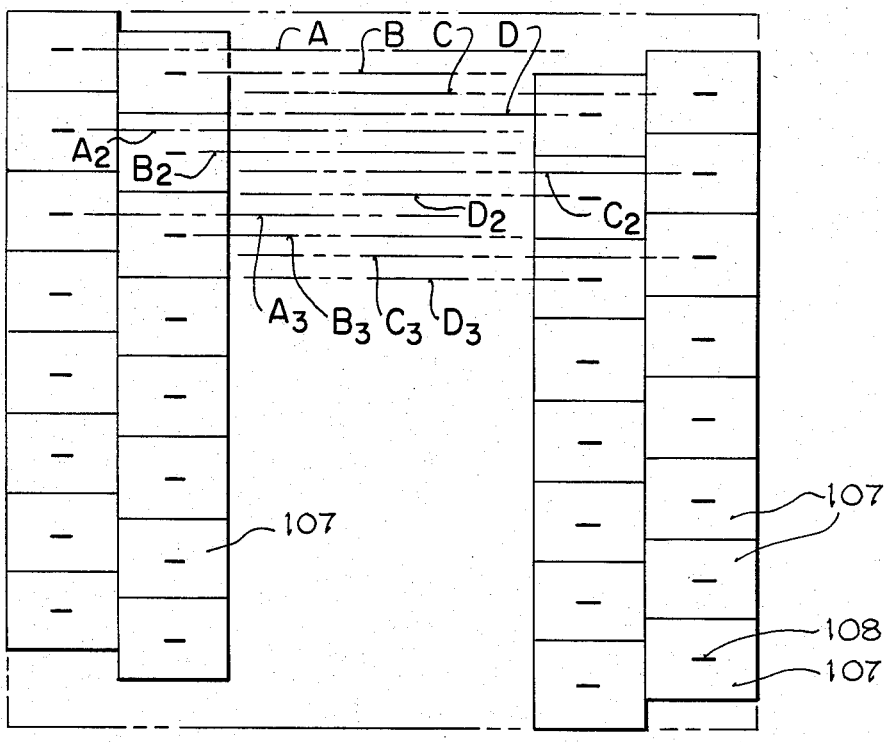
FIG_11
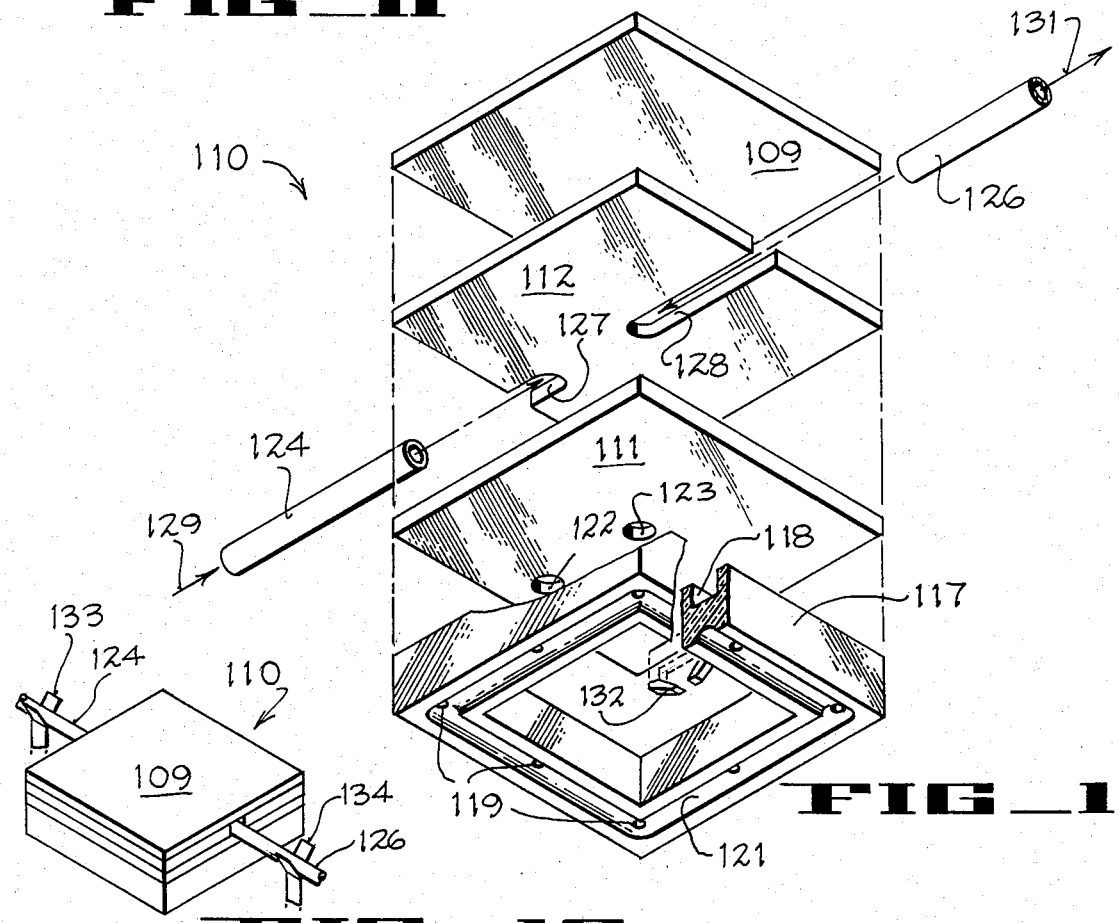
FIG_12
FIG_13

DISC DRIVE ASSEMBLY

This invention pertains to a disc drive assembly and more particularly to a disc drive assembly in which an improved head and bearing permit greatly increased packing density for information recorded thereon.

Packing density in present day disc drives suffers from several problems. One problem involves ball migration within the support bearings for the spindle. This condition introduces shaft wobble and a non-repeating eccentricity in the spindle rotation. Such a condition limits the number of tracks per inch which may be recorded on the disc to something on the order of 960 using the best ball bearings available. For example, at 2,000 tracks per inch the track width is 0.0005 inches whereby lack of consistant concentricity can cause track to track interference. It has been observed that the disclosed design provides concentricity to 0.000001 inch or less.

An additional problem which inhibits increasing the information packing density pertains to the transducer assembly which is used to read, write and erase all data on the media. Transducer assemblies as now known require the media to rotate at high speeds (around 3,600 rpm) in order to fly. When flying, the transducer spacing from the media will vary within a range of something on the order of 0.000011 to 0.000019 inches thereby causing signal instability. Such transducer assemblies fly because of air currents created by the high speed rotating disc surface therebeneath (or above). The speed of these air currents varies from those at the outer margin of the disc to those at the inner margin of the disc whereby, the head to disc spacing will vary as it moves from the outer to the inner margin or vice versa. This variation in height of the transducer assembly with respect to the recording media causes amplitude, resolution and overwrite variations.

As disclosed herein, it has been observed that a transducer assembly has been provided which will fly at speeds between 0 and 3,600 rpm. Accordingly, the transducer assembly herein does not require the spindle to rotate in order to be spaced from the record surface. In addition, when flying it has been observed to fly at 0.000004 inches compared to the spacing noted above thereby greatly increasing resolution, amplitude and overwrite.

In view of the fact that the disclosed transducer assembly can fly at low media speed, the packing density of a drive can be greatly increased. For example, for each inch of track, slowing the spindle speed by ⅓, for example, essentially triples the number of bits per inch which can be recorded.

In addition, lubrication of the media as is now typically done can be eliminated by virtue of the fact that the transducer assembly can fly without the disc moving, thereby decreasing the cost of the media by approximately 10%.

As disclosed herein, a improved disc drive assembly characterized by the advantages of an enhanced spindle support and transducer assembly provides a drive having a substantially increased number of tracks per inch and bits per inch. It has been observed that the number of tracks per inch can be doubled and bits per inch tripled. Accordingly, the packing density will have been increased by a factor of six ($2 \times 3$) without making any other major changes to the equipment. Thus, a drive can be provided having a non-lubricated medium with greater amplitude, resolution and better overwrite because of the more closely positioned transducer assembly and more accurately rotating spindle.

In general a disc drive assembly has been provided herein of a type employing a rotating disc having a record surface thereon for carrying information. Means supporting the disc for rotation includes a tapered body and seating means for receiving the body. Air bearing means disposed between the seating means and the body tend to urge the body upwardly from the seating means while means applying a suction to the body serves to draw the body downwardly against the air bearing means notwithstanding the upward urging applied by the air bearing so as to center and maintain the body and spindle on the axis of rotation. A transducer assembly having a sensing element for transducing information signals with respect to an information track of a rotating disc carried by the spindle includes means for drawing the sensing element into extremely closely spaced relation to, and to slide upon an air bearing along, the surface of the record disc.

In general it is an object of the present invention to provide an improved disc drive assembly characterized by vastly increased track density.

Another object of the invention is to minimize eccentricity and/or oscillation of the support spindle for such a disc drive.

Yet a further object of the invention is to provide a disc drive wherein the record tracks thereon lie more precisely concentric to the center of the disc.

An additional object of the invention is to provide an improved air head assembly capable of flying without requiring disc rotation, and flying more closely to the record surface so as to provide greater resolution, amplitude and overwrite.

Yet another object of the invention is to provide, in a disc drive assembly, an improved air head assembly operable at low disc velocity so as to greatly increase the packing density of information recorded thereon.

Yet another object of the invention is to provide in a disc drive assembly an air head assembly whereby lubrication materials need not be applied to the record to overcome "stiction"/friction.

A further object of the invention is to provide in a disc drive an improved air head assembly wherein the head follows the surface of the disc closely and faithfully to permit the head assembly to be used on discs having enough run-out or warp to cause them to be rejected under present criteria.

The foregoing and other objects of the invention will become more readily evident from the following detailed description of preferred embodiments when considered in conjunction with the drawings.

FIG. 1 shows a diagrammatic perspective view of a disc drive assembly according to one embodiment of the invention;

FIG. 2 shows a diagrammatic perspective view, partially broken away, taken from beneath FIG. 1 showing a keeper or brake assembly in enlarged detail;

FIG. 3 shows an elevation section view of a spindle assembly according to the invention;

FIG. 4 shows an enlarged detail view of a portion of FIG. 3 taken along the line 4—4 thereof;

FIG. 5 shows an elevation section view of a spindle assembly according to another embodiment of the invention;

FIG. 6 shows a diagrammatic perspective view of a transducer assembly as viewed from beneath according to the invention;

FIG. 7 shows an elevation section view taken along the line 7—7 of FIG. 6;

FIG. 8 shows a diagrammatic elevation section view according to another embodiment of the transducer assembly shown in FIG. 7;

FIG. 9 shows a bottom plan view of the transducer assembly shown in FIG. 8 and taken along the line 9—9 thereof;

FIG. 10 shows a diagrammatic perspective view of a disc drive assembly according to another embodiment of the invention employing the transducer assembly shown in FIGS. 8 and 9;

FIG. 10A shows a diagrammatic enlarged detail view for explanation of a portion of the disc surface of FIG. 10 taken in the region of the line 10A—10A;

FIG. 11 shows a diagram representative of the layout of the underside of the transducer assembly shown in FIG. 9 for explanation;

FIG. 12 shows a diagrammatic perspective view of a composite transducer assembly according to yet another embodiment of the invention; and FIG. 13 shows a diagrammatic perspective exploded view of the transducer shown in FIG. 12 as viewed from beneath.

In general a disc drive assembly 10 for achieving the foregoing objectives and others combines the advantages of an improved bearing support means which serves to minimize eccentricity or oscillation of spindle rotation with an improved head assembly 12 capable of flying in substantially closer relation with respect to the disc surface.

Bearing assembly 11 includes a housing 13 formed with an open compartment or cavity 14 having top and bottom tapered openings 16, 17 thereto.

Means for supporting a drive shaft or spindle 18 includes a tapered or truncated conical journal body 19 carried by shaft or spindle 18 and disposed within cavity 14. Journal body 19 includes first and second tapered portions 21, 22 to be generally nested within the top and bottom openings 16, 17 and substantially closing these openings.

The slope of the side walls of top and bottom openings 16, 17 corresponds to the slope of the first and second tapered body protions 21, 22 respectively so as to receive the first and second tapered portions seated therein.

While the top and bottom tapered openings 16, 17 serve to form seating means for receiving body 19, air bearings formed between body 19 and seating means 16, 17 tend to urge body 19 upwardly from the seating means while a counteracting force serves to draw body 19 downwardly toward seating means 16, 17 thereby centering body 19.

Thus, means for discharging air under pressure between the side wall of each opening 16, 17 and the first and second tapered portions 21, 22 respectively serves to form an air lubricated bearing therebetween as now to be described.

A source 23 of air pressure supplies air into housing 13 via a path traced along the line 24 through a fitting 26 and into a bifurcated flow path 27 within housing 13. The lower end of flow path 27 has been designated by reference 27a and the upper end by reference 27b. As thus arranged the flow passages 27a, 27b transmits air downwardly and upwardly to be discharged against tapered portions 21, 22 of journal body 19. Accordingly, annular grooves 31 have been formed to extend around the upper and lower tapered portions 21, 22 for receiving a supply of air discharged thereto via a series of small air passages 28, 29, respectively. As thus arranged grooves 31 constitute something of a manifold extending around each end of the journal body 19 in a manner for supplying air under pressure between the exterior surface of journal body 19 and the interior surfaces of openings 16, 17.

The interior of journal housing 13 includes an enlargement 14a to cavity 14. Enlargement 14a surrounds journal body 19 to provide a discharge manifold.

As thus arranged means are provided for coupling a relatively negative air pressure source to cavity 14 to evacuate air from within cavity 14 so as to act upon journal body 19 in a manner to draw the journal body tightly against its air lubricated bearings formed at its opposite ends. Thus, a vacuum source 30 coupled to manifold 14a via the line 35, fitting 33 and the flow passage 34 serves to draw air out of manifold 14a to form a suction therein.

In operation, the suction applied to manifold 14a serves to draw journal body 19 downwardly tightly against the air bearings formed between the upper and lower ends of body 19 and journal housing 13 as now to be described.

In view of the fact that the applied suction will surround body 19, the suction forces will act against the peripheral surface of body 19 generally in a direction of the vectors 36, 37. No lateral force will be applied to move body 19 to one side or the other by virtue of the vectors 36, 37 since the laterally acting component 36a, 37a of each vector 36, 37, oppose each other to an equal degree.

However, since body 19 is tapered (rather than cylindrical) vectors 36, 37 also include a downward component 36b, 37b. These components are additive to each other as compared to being opposed to one another, thereby drawing body 19 downwardly for tightly seating body 19 against its respective air bearings.

A keeper assembly 38 (FIG. 2) carried on the lower end of spindle 18 forms a spring brake disposed axially of body 19.

Thus, the underside of housing 13 forms a stationary brake surface 39. The braking means includes a disc 41 secured to rotate with spindle 18 and formed with a number of pockets 42 for alternately carrying, as shown in FIG. 2, compression springs 43 and guide pins 44.

An annular brake shoe 46 includes an upper surface confronting the brake surface 39 and is coupled to rotate with disc 41 (and spindle 18) by pins 44. Springs 43 yieldingly urge brake shoe 46 toward the brake surface. Thus, the confronting surfaces of the brake shoe 46 and the brake surface 39 are substantially parallel to provide a drag therebetween when mutually engaged. However, in operation, portions 27c of air passages 27a discharge air under pressure downwardly between the confronting surfaces of shoe 46 and surface 39 to disengage shoe 46 from surface 39 to provide an air lubricated bearing therebetween. Thus, the downwardly extending portions 27c of air passages 27a discharge into an annular channel or manifold 47 whereby the downwardly discharging air surrounds the lower end of housing 13 to act against brake shoe surface 46.

The open center of brake shoe 46 is large enough to permit air to readily escape from both the air bearing thereabove and the air bearing defined between tapered surface 22 and the wall of tapered opening 17.

Means for driving spindle 18 may include, as shown in FIG. 1, a simple drive belt 48 coupled to a power supply represented by drive pulley 49. As shown in FIG. 3, however, an induction motor has been provided by means of an armature 51 carried at the lower end of spindle 18 and disposed between the field windings 52 whereby energizing windings 52 serves to rotate armature 51 and spindle 18.

According to another embodiment of the spindle assembly as shown in FIG. 5 the journal body includes conical portions 53, 54 disposed adjacent the tapered side walls at the upper and lower ends of bearing housing 56 and separated by a right cylindrical central portion 55. Portion 55 is sufficiently relieved so as to accommodate the introduction of an armature 57 carried by the journal body within the open cavity 58 and field windings 59 disposed adjacent armature 57. Thus, the armature and windings serve to form an electric motor disposed within cavity 58 for rotating the journal body and spindle 61.

Thus, it will be readily evident that a journal body has been provided which serves as a combined journal and thrust bearing and which when drawn downwardly within its associated journal housing serves to seat the journal body accurately on the axis of rotation thereof.

In the embodiment shown in FIG. 5, a positive pressure source 62 supplies air into the assembly and a negative pressure source 63 serves to withdraw air from the unit. The journal body unit comprised of the upper and lower journal body portions 53, 54 coupled together by means of a right cylindrical central body portion 55 is drawn downwardly within housing 56 by virtue of the fact that the undersurface of upper journal body portion 53 provides a substantially larger area against which a suction from the negative pressure source 63 can act as compared to any area which might exist at the lower journal body portion 54.

Finally, an air passage 64 is divided as described above and leads into grooves 67, 68 for providing an air bearing between the upper and lower end of the journal body. The negative pressure source 63 applies a suction to the internal cavity 58. The foregoing suction is applied directly to the underside of the conically shaped journal body portion 53 so as to draw the body portion 53 downwardly and cause both the upper and lower body portions 53, 54 to be seated firmly against their associated air bearings.

It has been observed that by use of a spindle support bearing of the kind described the concentricity of record tracks will be sufficiently perfect to permit record tracks to be spaced at intervals of less than one microinch.

While a support bearing of the kind described which combines both a journal and thrust bearing function may have a number of additional uses, it is particularly useful in providing a disc drive assembly when combined with a transducer assembly as now to be described.

Thus, for use in a disc drive assembly of a type employing a rotating disc having a record surface thereon for carrying information, a transducer assembly 69 includes a body 71 having a top and a bottom. The bottom of body 71 is adapted to confront the disc and includes an open cavity or compartment 72 bounded by means forming a wall or rim 73 extending around the cavity. Rim 73 defines a cup-like portion beneath body 71.

The end surface 73a of rim 73 lies substantially in a plane and is adapted to be disposed substantially parallel to the disc surface. Means providing an air bearing beneath edge 73a of head assembly 69 includes means for supplying air under pressure to pass beneath rim 73.

As shown in FIG. 7, body 71 includes an upper portion 71a and a lower portion 71b. The two parts are fixed together and a channel 76 formed to extend around the top side of the bottom portion 71b. A number of small flow passages 77 extend downwardly from channel 76 to a groove 78 adapted to confront the surface of a disc. In this manner channel 76 can serve as a manifold for evenly distributing air entirely around head assembly 69 as air is supplied under pressure via the tubing 74. Thus, a source of positive pressure 79 supplies air under pressure for discharge into groove 78 so as to form an air bearing beneath rim 73.

A sensing element or transducer 81 is fixed within compartment 72 as by means of an epoxy or other bonding material serves to cooperate with record tracks of the disc.

Means forming a discharge flow passage leading out of the cup-like portion or compartment 72 to a negative pressure source serves to draw a suction via compartment 72 to draw body 71 toward the disc and against the air bearing disposed beneath the edge 73a of rim 73. Thus, a negative pressure source 82 draws a suction on the cup-like compartment 72 via the line 83 leading into a discharge flow passage 84 disposed centrally through the top of compartment 72.

In operation as air under pressure is supplied via groove 78 an air bearing will try to exhaust beneath the edge 73a of rim 73. Since the air being discharged extends via groove 78 the air bearing will be substantially uniformly distributed around the edge 73a of rim 73, thereby surrounding the entire compartment or cavity 72. Obviously, the presence of such an air bearing serves to lift the head from the surface of the disc to space the transducer or sensing element 81 further from the disc.

By applying suction to compartment 72 transducer assembly 69 can be drawn closely to the disc separated only by the very thinnest of air bearings passing beneath edge 73a.

In short, the air being discharged is discharged completely around the underside of transducer assembly 69 and the vacuum or suction which is drawn is taken up through a relatively large central port or flow passage 84 which draws substantially equally from all parts of compartment 72.

In the foregoing manner fluid pressure has been applied around the periphery of assembly 69. Some of this pressure is counteracted by a substantial suction discharged centrally of body 71. This technique disposes transducer assembly 69 and its associated sensing element 81 under controlled conditions closely enough to the disc to transduce record tracks disposed much closer together.

Another embodiment, as shown in FIGS. 8 through 11 takes advantage of the extremely concentric nature of the tracks applied to a rotating disc. Thus, a rotating disc drive 86 using a head assembly "accessing" 32 tracks at a time, serves to transduce information with respect to 3200 tracks simply by positioning the head assembly to any one of only 100 tracks.

A bearing housing 87 and air bearing support means therein as described above supports a spindle 88 and a disc 89 carried thereon. As diagrammatically shown in FIG. 10, suitable positioning means 91 moves a transducer assembly 92 to various tracks as described more fully below.

Thus, a transducer assembly 92 includes a support body 93 adapted to be disposed with a side thereof in confronting relation to the record disc. The side includes means forming a suction cup therein for drawing the body 93 toward the record disc. Body 93 is generally rectalinear and comprised of an upper and lower portion secured together so as to permit the formation of a manifold channel 94 for distributing air under pressure entering via tubing 96. This distributed air in channel 94 exhausts downwardly via the air passages 97 and the groove 98 formed along the end surface of the wall surrounding compartment 99. Finally, a tubing 101 forms a flow passage 102 adapted to be coupled to a negative pressure source so as to draw the head assembly 92 toward the disc.

Head assembly 92 includes a number of transducers each of which is offset slightly from the other so as to be able to read different tracks. Thus, four separate pluralities or groups of transducer elements or sensing elements respectively include the group 103, 104, 105 and 106. For identification, each transducer in a given group is followed by a letter in sequence so as to make any given transducer individually identifiable.

Thus, in group 103, for example, the sequence of transducers commencing at the top as viewed in FIG. 9 may be identified as 103$a$, 103$b$, 103$c$, 103$d$, etc.

The four groups 103, 104, 105 and 106 of transducers, as noted, are slightly offset from each other in the foregoing sequence. Thus, as noted in FIG. 9, and with respect to any given progressive sequence of transducers, such as 103$a$, 104$a$, 105$a$ and 106$a$, as the head assembly remains stationary, each of four record tracks can be transduced simply by electronically switching from one track to the next.

Since thirty-two transducers are shown, it is possible to transduce signals with respect to thirty-two tracks or traces on the disc without moving the head assembly 92. It has been observed that as many as one hundred tracks can be disposed between the traces defined by any two successive transducers in the sequence between 103$a$ and 106$h$. For example, as many as one hundred traces or tracks on the disc can be transduced in the space defined between transducer 103$a$ and transducer 104$a$.

Accordingly, since 32 tracks can be transduced at any one position of head assembly 92, the head positioning means 91 needs only to move head assembly 92 across one hundred tracks in order to be able to transduce as many as 3200 tracks in the arrangement shown in FIG. 9.

For example, with reference to FIGS. 10 and 10A, tracks 113, 114, 115 and 116 can be traced by transducers 103$a$, 104$a$, 105$a$ and 106$a$, respectively, leaving one hundred tracks between each pair of the above identified tracks 113, 114, 115, 116.

As represented in the diagram of FIG. 11, each block 107 represents a transducer element and the short dash 108 therein represents the sensing gap of the transducer element. With transducers offset as shown in FIG. 11, successive traces A, B, C, D; $A_2$, $B_2$, $C_2$, $D_2$; $A_3$, $B_3$, $C_3$, $D_3$; etc. can be successively transduced with a number of tracks between each successive pair.

Means for positioning head assembly 92 to any one of a large number of positions can be done using a screw drive wherein a predetermined degree of rotation of the screw serves to displace assembly 92 from one track to the next. Other known positioning means can also be employed.

Thus, the sensing elements of the groups of transducers are substantially uniformly distributed and adapted to be disposed radially across the disc with respect to each other. The sensing elements of one group are offset from the sensing elements of another group by a predetermined displacement adapted to accommodate a number of record tracks therebetween. The displacement typically extends radially of the disc as shown. Further, each sensing element of one group of transducers serves to cooperate and sense information from its own associated group of tracks of information on the disc independently of tracks of other groups. Further, each sensing element of another plurality of transducers senses information from its own associated group of tracks on the disc likewise independently of any other groups.

As shown in FIGS. 12 and 13, a laminated transducer assembly has been provided according to another embodiment for transducing information with respect to the disc. Thus, a pair of layers 109, 111 of electromagnetic shielding material, such as mu metal, sandwich a conductive layer 112, such as copper, for shielding against radiated electronic interference. An annular body 117 of ceramic material or the like formed with a downwardly facing groove 121 therearound supplies air beneath head assembly 10 as now to be described.

Body 117 includes a channel 118 extending around its upper edge surface forming a manifold to discharge air under pressure via downwardly directed air passages 119 into groove 121.

When assembled, channel 118 aligns with an opening 122 extending through layer 111. Another opening 123 forms a port centrally of body 117 for withdrawing air therethrough from within the bounds of body 117.

In addition, semi-rigid tubular elements 124, 126 fit into slots 127, 128, respectively formed in the plane of layer 112. Elements 124, 126 are of a size and dimension of the order of a hypodermic needle or the like.

Accordingly, in assembly 10 as shown in FIG. 12, air under pressure represented by the arrow 129 is supplied via element 124 to be discharged downwardly through port 122 into channel 118 so as to provide an air bearing beneath assembly 110.

Thus, the air exhausting downwardly through air passages 119 and beneath head assembly 110 serves to urge assembly 110 away from a disc with which it is cooperating. However, means forming a flow passage (in the form of port 123, groove 128 and element 126) centrally of body 117 adapted to be coupled to a suction source represented by the arrow 131 serves to draw transducer assembly 110 toward the disc against the air bearing therebeneath. Finally, a transducer element 132 may be carried from layer 111 or from body 117. Layers 109, 111, 112 and body 117 can be readily secured together by suitable bonding means with elements 124, 126 fixed within their respective slots so as to form a pivoting mounting axis upon which transducer assembly 110 can be carried.

It has been observed that by forming an air bearing fully surrounding the head assembly and then counteracting the upward forces of the air bearing by applying a suction tending to draw the head toward the disc, the head assembly may be employed with many discs having enough run-out or warp in them as to cause such warped discs to be otherwise unusable.

Further, this continuous parallelism between disc and head assembly is enhanced by the embodiment of FIGS.

12, 13. In addition to supplying and exhausting air to and from the head assembly 110, elements 124, 126 lie on a common axis so as to form a pivot support permitting assembly 110 to rock about the axis, supported as schematically shown by supports 133, 134. In this manner the suction applied to the cavity bounded by the walls of body 117 and layer or substate 111 serves to pivot the body 117 into parallelism without the surface of a disc moving therebeneath even though the disc surface may be warped.

Transducer assembly 110 has an extremely thin profile whereby it has the additional advantage of being able to be utilized between relatively closely stacked discs.

From the foregoing it will be readily evident that there has been provided an improved disc drive assembly characterized by an improved spindle support air bearing capable of virtually eliminating eccentricity in the recorded disc paths so as to permit the disc paths to be extremely closely spaced. In addition, the disc drive assembly is characterized by an improved air head assembly whereby the head flies extremely closely to the surface of the disc to take advantage of the close track spacing. In addition the head assembly follows the run-out of the disc so to permit it to be used with even somewhat warped discs.

I claim:

1. In a disc drive assembly of a type employing a rotating disc having a record surface thereon for carrying information and means for transducing the information with respect to said record surface, means supporting said disc for rotation on an axis extending normal to the disc through the center thereof to cause tracks of information to be disposed thereon concentrically of the center of the disc, the last named said means including a shaft carrying said disc and journal body means carried by said shaft, said journal body means being formed with a sloping side, an air bearing assembly including a bearing housing, said housing having top, bottom and side walls defining a hollow interior, tapered openings formed respectively through said top and bottom walls, the side walls of said openings sloping downwardly and radially inwardly to receive said journal body means nested therein, the slope of the side wall of said openings corresponding to the slope of that portion of said journal body means disposed adjacent thereto, and means forming air passages interposed between said body and said side walls of each opening to discharge air under positive pressure to supply an air lubricated bearing around those portions of said journal body means nested in said openings, a hollow cavity formed within said housing disposed between said openings, said cavity serving to define a manifold disposed about an intermediate portion of said body, means coupling a vacuum pump to said cavity to withdraw air from said manifold to draw said body downwardly against said air lubricated bearings to axially center said body within said housing.

2. In a disc drive assembly according to claim 1 in which said journal body means comprises axially spaced apart conical body portions, the outer surface of said body portions confronting said side walls of said openings respectively in closely spaced relation to form axially spaced air bearings therebetween.

3. In a disc drive assembly according to claim 1 further comprising spring brake means carried axially of said body, a stationary brake surface carried by said housing, said brake means including first and second annular bodies, said first body being coupled to rotate with said journal body means, said second body being coupled to rotate with said first body and to move between advanced and retracted positions with respect to said first body, means yieldingly urging said second body toward said brake surface, the confronting surfaces of said second body and said brake surface being substantially parallel to provide a drag therebetween when engaging each other, portions of said air passages discharging air under pressure against said confronting surface of said second body to disengage said second body from said brake surface and provide an air lubricated bearing therebetween.

4. In a disc drive assembly according to claim 1 comprising electric motor means disposed within said cavity for rotating said shaft; said body including axially spaced apart conical portions disposed adjacent said side walls of said openings, a shaft of substantially reduced diameter with respect to that of the larger conical portion disposed between and serving to space said conical portions apart, an armature carried by said body around said cylindrical shaft within said cavity, and field windings adjacent said armature, said armature and windings serving to form an electric motor disposed within said cavity.

5. In a disc drive assembly according to claim 1 in which said transducing means comprises a hollow body member having an opening forming a cavity exposed to one side of the hollow body member and adapted to confront a record disc, a relatively thick wall surrounding the last named said cavity, said thick wall having an end surface lying in a plane and adapted to confront the disc in co-planar relation, a suction port leading out of the last named said cavity for exhausting air therefrom to form a suction on one side of said hollow body serving to draw said hollow body toward the disc, a continuous groove formed in and extending along said end surface around the last named said cavity, means for supplying air under pressure from said groove against the disc to counteract the suction so as to space said end surface from said disc and form an air bearing between the disc and said end surface of said thick wall, and a transducer element carried by said hollow body, said element having a sensing portion disposed substantially in the plane of said end surface.

6. In a disc drive assembly a bearing assembly for supporting a shaft for rotation on the axis thereof, said bearing assembly comprising a bearing housing having top, bottom and side walls defining an open cavity therein, top and bottom openings respectively formed through said top and bottom walls, tapered journal means carried by the shaft and disposed within said cavity, said journal means having first and second tapered portions to be generally nested within said top and bottom openings for substantially closing said openings, said first and second tapered portions being carried by the shaft in spaced apart relation to form a gap therebetween the slope of the side walls of said top and bottom openings corresponding to the slope of said first and second tapered portions respectively to receive said first and second tapered portions therein, means for discharging air under pressure between the side walls of said openings and said first and second tapered portions to form an air lubricated bearing therebetween, and means coupling a vacuum pump to said cavity to apply a suction to said cavity to act upon said portions and draw said journal means tightly against said air lubricated bearings.